US008854996B2

(12) United States Patent
Abel et al.

(10) Patent No.: US 8,854,996 B2
(45) Date of Patent: Oct. 7, 2014

(54) ACCELERATING DATA PACKET PARSING

(75) Inventors: Francois Abel, Rueschlikon (CH); Jean L. Calvignac, Raleigh, NC (US); Chih-jen Chang, Apex, NC (US); Philippe Damon, Chapel Hill, NC (US); Fabrice J. Verplanken, LaGaude (FR)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 13/183,953

(22) Filed: Jul. 15, 2011

(65) Prior Publication Data

US 2012/0159132 A1 Jun. 21, 2012

(30) Foreign Application Priority Data

Dec. 16, 2010 (EP) .................................. 10306437

(51) Int. Cl.
*H04L 12/801* (2013.01)
*H04L 12/741* (2013.01)
*G06F 9/38* (2006.01)

(52) U.S. Cl.
CPC .............. *G06F 9/3885* (2013.01); *H04L 47/10* (2013.01); *H04L 45/74* (2013.01)
USPC ....................................................... 370/252

(58) Field of Classification Search
CPC ........ G06F 9/3885; H04L 45/74; H04L 47/10
See application file for complete search history.

(56) References Cited

U.S. PATENT DOCUMENTS

| | | | | |
|---|---|---|---|---|
| 5,339,421 | A | * | 8/1994 | Housel, III ..................... 719/328 |
| 6,393,551 | B1 | | 5/2002 | Singh et al. |
| 7,178,013 | B1 | * | 2/2007 | Batcher ......................... 712/241 |
| 2003/0156586 | A1 | * | 8/2003 | Lee et al. ...................... 370/392 |
| 2005/0100019 | A1 | * | 5/2005 | Sahita et al. ................ 370/395.2 |
| 2008/0112415 | A1 | * | 5/2008 | Sobaje .......................... 370/392 |
| 2008/0205403 | A1 | | 8/2008 | Akyol et al. |
| 2009/0067446 | A1 | | 3/2009 | Lee |

FOREIGN PATENT DOCUMENTS

| | | |
|---|---|---|
| EP | 1 336 915 A1 | 8/2003 |
| EP | 1 345 362 A2 | 9/2003 |
| WO | WO 01/22686 A1 | 3/2001 |

OTHER PUBLICATIONS

Hubertus Franke, The IBM Power Edge of Network Processor, 2010, p. 26.*
John Derek McMullin, Accelerating the parsing process with an Application Specific VLSI RISC processor, University of Central Lancashire, 1997.*
U.S. Appl. No. 13/570,343.
International Search Report and Written Opinion dated Feb. 15, 2012 for International Application No. PCT/EP2011/072452, 12 pages.

* cited by examiner

*Primary Examiner* — Hassan Phillips
*Assistant Examiner* — Omeed D Rahgozar
(74) *Attorney, Agent, or Firm* — Francis Lammes; Stephen J. Walder, Jr.; Parashos T. Kalaitzis (57) ABSTRACT

Mechanisms are provided for a network processor comprising a parser, the parser being operable to work in normal operation mode or in repeat operation mode, the parser in normal operation mode loading and executing at least one rule in a first and a second working cycle respectively, the parser in repeat operation mode being operable to repeatedly execute a repeat-instruction, the execution of each repeat corresponding to one working cycle.

21 Claims, 6 Drawing Sheets

ACCELERATING DATA PACKET PARSING

BACKGROUND

The present invention relates generally to the field of network processors and more particularly to a network processor and method for accelerating data packet parsing by means of a parser.

Due to the increasing use of data intensive applications such as video streaming or Voice-over-IP via the internet, communication links (e.g. optic or copper cables) and data processing units which are operable to transmit and process a large number of data packets in fractions of a second are needed. Data packet processing supporting said data intensive applications requires immense computational power and the demand for processing power for managing Internet traffic is continuously growing. New types of specialized processors, so called 'network processors' were developed which are particularly suited for the handling and processing of data packets to be transmitted via a network, in particular the Internet.

In the past, network processors were either constructed as general-purpose processors (GPPs) or as application-specific integrated circuits (ASICs). While GPPs provide for high flexibility, they have not been designed specifically for the needs related to network processing and are therefore often too slow. To the contrary, ASICs are integrated circuits (ICs) having been designed for the particular needs of processing data packets to be transmitted over a network. ASICs can therefore solve their particular tasks very quickly and efficiently, but they are expensive and inflexible.

Processing data packets by a network processor usually comprises a parsing step wherein a parser of the network processor extracts and analyzes the contents of packet headers and fields and passes parsed packets or parts thereof to other network processor components. The speed of the programmable parser is generally determined by the time required by the parser to load an instruction and to execute it. Parsing performance is typically increased by increasing the clock frequency of the logic storing and/or executing a parsing instruction. Said approach requires a more powerful and expensive hardware and leads to an increased power dissipation, an unwelcome effect in financial and ecologic terms.

SUMMARY

It is an objective of embodiments of the present invention to provide for an improved network processor and method for increasing the performance of parsing data packets by a parser of a network processor, in particular in the context of multi-gigabit networks.

In one aspect, embodiments of the invention consist of a network processor comprising a rules repository and a parser. The rules repository can be any kind of data storage, e.g. a transitory or a non-transitory storage medium which is part of or operatively coupled to the network processor. According to embodiments, the rules-repository can be part of or be operatively coupled to the parser. A rules repository may be implemented e.g. as relational database, as data storage comprising one or more files, the files comprising one or more rules, as data storage comprising rules in a serialized data format and the like. The rules repository may comprise a plurality of rules. The parser comprises one or more processing units which execute one or more rules having been loaded by the parser from the rules repository. Depending on the embodiment, said one or more processing units may be implemented e.g. as picoprocessors.

The parser is operable to work in at least a 'normal operation mode' and a 'repeat operation mode'. In normal operation mode, the parser is operable to load at least one rule from the rules repository in a first working cycle. In normal operation mode, the parser is also operable to execute said at least one loaded rule on a data packet in a second working cycle, thereby analyzing said data packet, whereby an analysis result is generated by the parser.

In repeat operation mode, the parser is operable to reapply a repeat-instruction on said data packet in each of one or more repeats. Each repeat is executed by the parser in one subsequent working cycle. Executing said first working cycle for loading said repeat-instruction is unnecessary in repeat operation mode and is therefore not executed in repeat operation mode of the parser. The parser is operable to dynamically switch from normal operation mode to repeat operation mode in dependence of said analysis result. Depending on the analysis result, the parser may likewise stay in normal operation mode.

The parser determines the number of repeats to be executed in said repeat operation mode dynamically by evaluating loaded data. Said loaded data is any data or instructions which is immediately available for execution by the one or more processing units executing instructions of the parser at the time of entering repeat operation mode. The term 'immediately' hereby implies that no additional clock cycle is required for loading said data or instructions.

In a further aspect, embodiments of the invention relate to a method for accelerating data packet parsing executed by a network processor. In the embodiments, a rule is loaded from a rules repository in a first working cycle by a parser, the rules repository comprising a plurality of rules, the parser operating in a normal operation mode. The at least one loaded rule is executed on a data packet in a second working cycle in normal operation mode to analyze said data packet, whereby an analysis result is generated by the parser. The embodiments dynamically switch between the normal operation mode and a repeat operation mode of the parser, the switching being executed in dependence on said analysis result. In case the parser switched to repeat operation mode, the embodiments reapply a repeat-instruction on said data packet in each of one or more repeats, each repeat being executed in one subsequent working cycle. In the embodiments, executing a first working cycle for loading said repeat-instruction in repeat operation mode is unnecessary and skipped. In the embodiments, the parser determines a number of repeats to be executed in said repeat operation mode dynamically by evaluating loaded data, said loaded data being at least one of: data being part of the loaded at least one rule, and data being part of the data packet.

In a further aspect the invention relates to a computer program product comprising a computer-readable non-transitory storage medium comprising instructions which, when executed by a processing device, execute the steps of the method of operating a network processor according to any of the above embodiments.

According to the invention a network processor, method for operating said network processor and computer readable media as described in the appended independent claims are provided. Embodiments of the invention are described in the appended dependent claims. Further aspects of the invention will now be described, by way of preferred implementation and examples, with reference to the accompanying figures.

BRIEF DESCRIPTION OF THE SEVERAL VIEWS OF THE DRAWINGS

The above and other items, features and advantages of the invention will be better understood by reading the following more particular description of embodiments of the invention in conjunction with the figures wherein.

DETAILED DESCRIPTION

Embodiments of the invention are described herein after by way of examples with reference to the accompanying figures and drawings.

A 'network processor' as used herein is an integrated circuit which has a feature set specifically targeted at the networking application domain. Network processors usually consist of multiple heterogeneous, connected processing and memory units. Network processors are components of many different types of network equipment such as routers, switches, firewalls, session border controllers and the like.

A 'rule' as used herein is a set of computer interpretable instructions specifying how one or more data packets are to be processed. A rule according to embodiments of the invention is a computer-interpretable statement with at least two logical parts: an if-clause and a then-clause, whereby the then-clause is only executed in case the if-clause returns the Boolean value 'true'.

A 'rules repository' as used herein is any volatile or non-volatile computer-readable data storage medium having stored a plurality of rules.

The term 'action machines' as used herein refers to hardware accelerators which are part of the network processor. Action machines process selected parts of data packets and support functions such as packet parsing and classification, high-speed pattern search, checksum calculation and others.

The term 'picoprocessor' as used herein refers to a scaled down RISC processor. A picoprocessor according to some embodiments comprises sixteen 32-bit or thirty-two 16-bit general purpose registers per thread and a one-cycle arithmetic-logical unit (ALU) supporting an instruction set that includes e.g. binary addition and subtraction, bit-wise logical AND, OR and NOT operations, compare operation, a counting function, a logical or arithmetic shift left and right, bit-manipulation commands and others.

A 'repeat-instruction' as used herein is any kind of computer-interpretable instruction which can be executed repeatedly by the parser of a network processor. Depending on the hardware environment, said repeat-instruction can be implemented in any kind of programming language such as e.g. ASSEMBLER or C and in any kind of higher level data structure, e.g. in the form of rules.

A 'packet pointer' as used herein is a memory address pointing to a particular bit or byte of a packet.

The term 'working cycle' as used herein refers to a logical unit of work. Depending on the embodiment and in particular on the hardware infrastructure of the network processor used in said embodiments, each working cycle may correspond to exactly one clock cycle or to n clock cycles wherein n is an integer larger than 1.

The expression 'loaded data' as used herein refers to any data, including computer-interpretable instructions, which is available for a processor without any additional clock cycle for loading said data. 'Loaded data' can be stored e.g. in one or more registers of said processor or can be part of the inbuilt instruction set of said processor.

Figure 1:
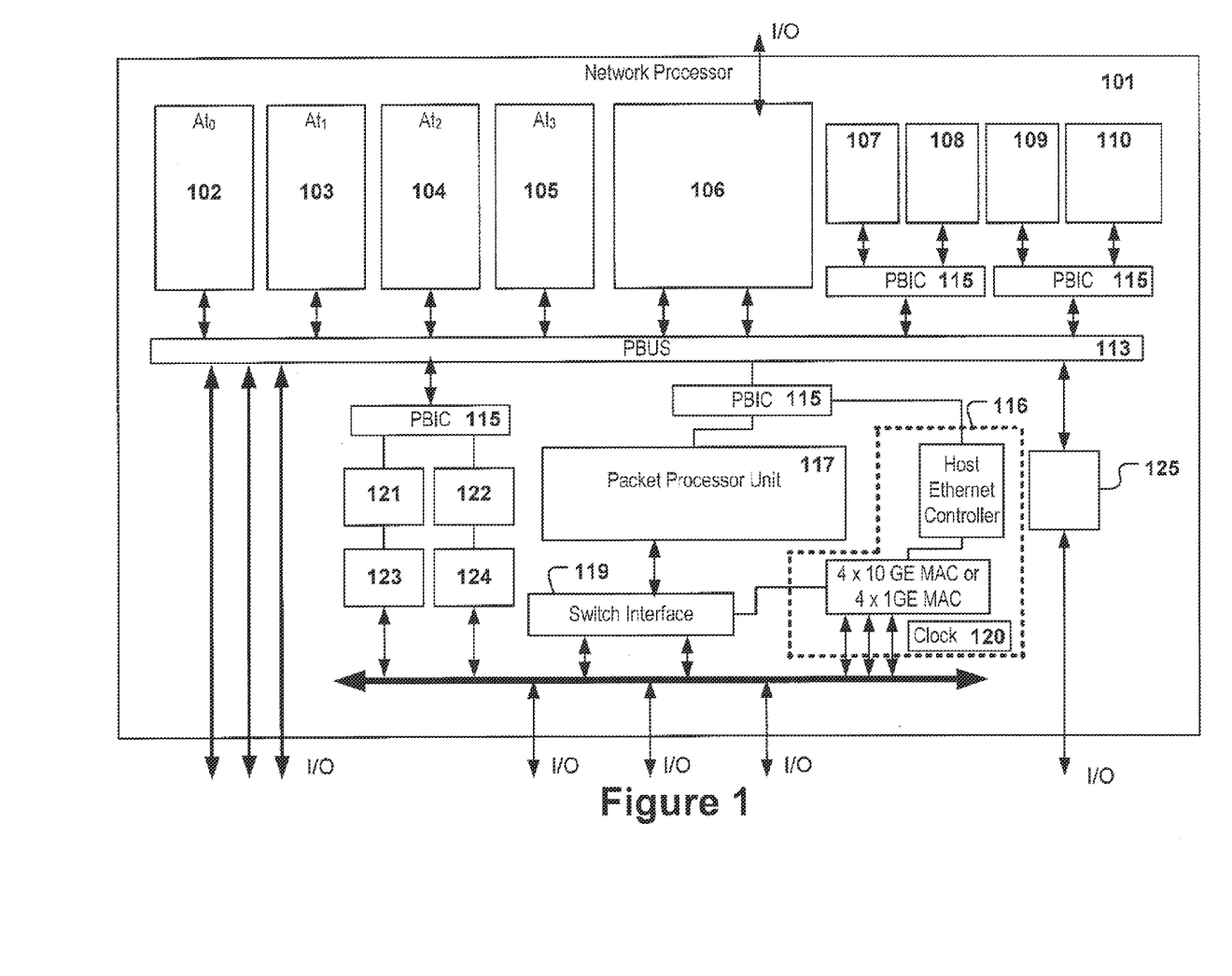
FIG. 1 depicts a high-level network processor architecture.

FIG. 1 depicts a network processor 101 of the 'Prism' architecture type. Said network processor comprises a multitude of components for receiving, buffering, processing and forwarding data packets. Some core components which can be identified on a high-level perspective, for example:

Processors 102-105 are, according to preferred embodiments, general purpose processors. Each processor may comprise an L2 cache and may be implemented as a combination of a micro-engine performing bit wise serial processing and a reduced instruction set computer (RISC) processor performing packet/cell queuing. The channel processors can be grouped into a cluster of e.g. four channel processors to provide combined processing for high rate interfaces such as gigabit Ethernet.

The memory access unit 106 is in charge of performing I/O operations on the system memory. Said system memory is the main memory of the device comprising the network processor. Said device could be, for example, a router or a switch;

Several network processor modules 107-110 execute additional functions, e.g. security functions such as encryption, authentication, firewalling, and/or intrusion detection; pattern matching; compression and decompression and others;

A Host Ethernet Adapter (HEA) 116 is a physical Ethernet adapter for the processors 102-105 of the network processor. HEAs offer high throughput, low latency, and virtualization support for Ethernet connections. HEAs are also known as Integrated Virtual Ethernet adapters (IVE adapters). According to embodiments, the HEA supports a network traffic speed of e.g. 4×10 GB/s. A core function of the HEA can be seen as a module providing hardware acceleration for network processing tasks. The HEA comprises a host Ethernet controller and a media access control unit (MAC unit). A MAC is a unique identifier assigned to network interfaces for communication on the physical network segment. MAC addresses are most often assigned by the manufacturer of a network interface card and are stored e.g. in its hardware, the card's read-only memory, or some other firmware mechanism.

PBIC or bus interface(s) 115 units are interfaces between the network processor bus 113 and other components of the network processor.

The network processor bus 113 interconnects the elements of the network processor.

The Packet Processor Unit 117 comprises several modules for Quality of Service (QoS) functions and data packet scheduling. It comprises a direct memory access (DMA) module for direct system memory access. The Packet Processor Unit 117 executes data packet processing of data packets to be transported by the switch interface 119. The switch interface 119 acts as interface of the packet processor unit 117, the HEA and several I/O channels indicated at the bottom of FIG. 1.

Additional network processor modules 121-125 are used for various I/O related functions.

In the following figures, functional modules of and/or method steps executed by the HEA will be described in greater detail.

Figure 2:
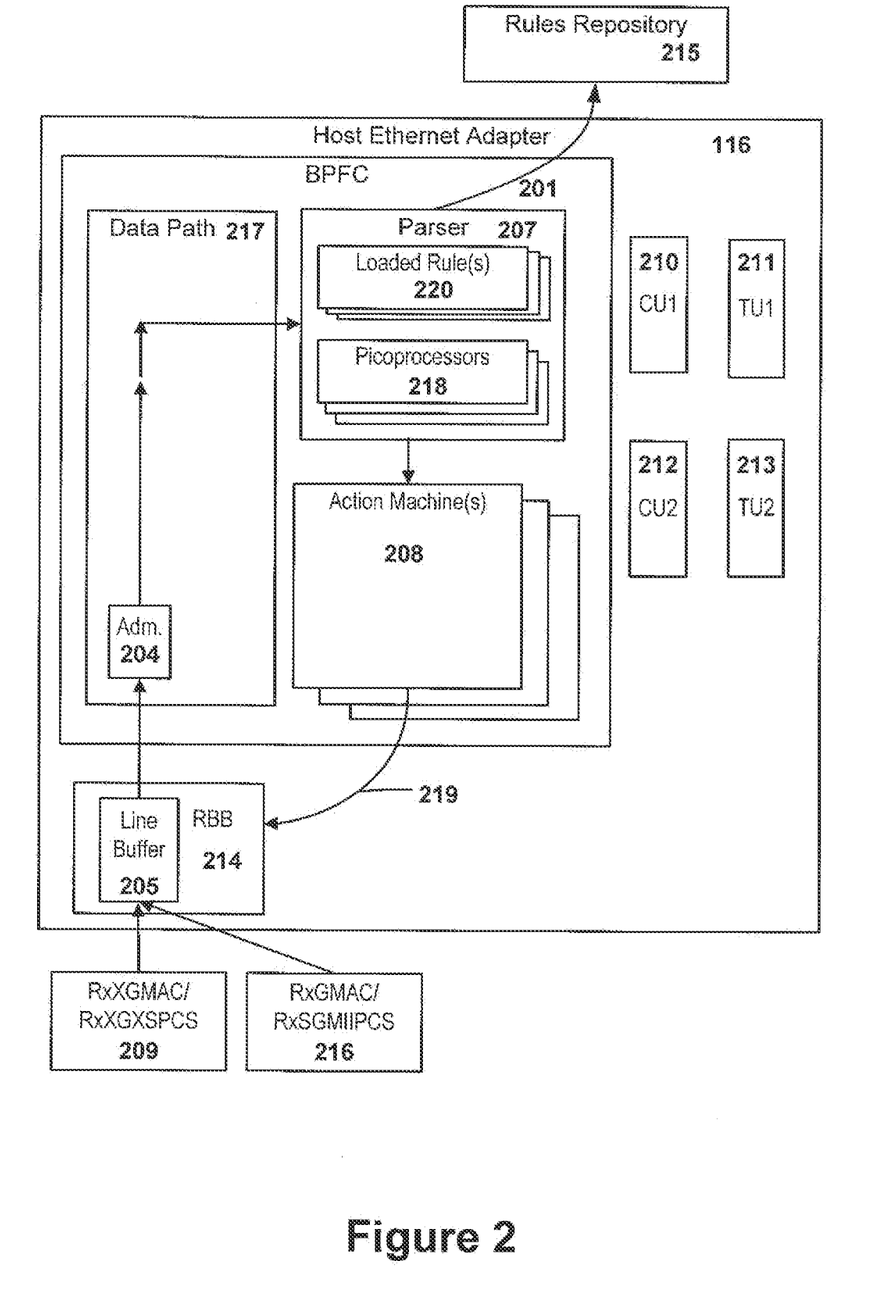
FIG. 2 depicts the host Ethernet adapter being part of the network processor in greater detail.

FIG. 2 depicts the host Ethernet adapter 116 which comprises a multitude of modules for receiving, processing and transmitting data packets in greater detail. Only a small subset of components and modules of the HEA is depicted in FIG. 2. Modules for processing data packets 210, 212 and modules 211, 213 for transmitting said data packets can be based—depending on the implementation of the HEA—on a multitude of different hardware and/or software components such as memories, integrated circuits (ICs), software modules, and the like.

Data packets are received from an RxXGMAC/RxXGX-SPCS component 209 and an RxGMAC/RxSGMIIPCS component 216. Said components 209, 216 are hardware components providing for low level hardware operations comprising, e.g. receiving data packets, classifying the received packets and forwarding said data packets to the RBB unit 214. The RBB unit 214 is operable to execute complex, high-level operations on the data packets which may require a considerable amount of processing time. As the number of data packets received by the RBB unit 214 from the components 209, 216 per time unit may exceed the amount of data packets the RBB unit 214 is operable to process, the received data packets are stored in the line buffer 205. A line buffer is a data structure that holds a fixed amount of data in a sequential order, e.g. according to the order the data packets are received by the line buffer; the line buffer 205 together with the RBB unit 214 constitutes a temporary data packet buffer helping to level out differences in the speed of receiving and processing data packages by the RBB unit 214. The terms 'low-level' and 'high-level' as used herein indicate that 'high-level' operations are typically, but not necessarily, of complex structure, computational demanding and implemented by a software module while 'low-level' operations are typically, but not necessarily, of a more simple nature and are typically implemented by hardware modules, e.g. application-specific integrated circuits (ASICs).

After having been processed by the RBB unit 214, the data packets are forwarded from the RBB unit 214 to the BPFC module 201. The BPFC module ('BFSM Parser Filter Checksum') 201 is a module that receives data packets from the RBB unit 214, processes the received data packets and returns them to the RBB unit 214 (arrow 219). One of the main functions executed by the BPFC unit 201 is to determine which of a plurality of packet queues shall actually receive a particular processed data packet and to check whether said determined packet queue is available and ready to receive a packet. A list of available queues may be stored in a QPN table. The BPFC unit 201 or components thereof further are responsible for tracking the packages and bytes received and processed, for classifying received packets, for checksum calculation and other tasks.

The BPFC module 201 comprises three main physical and/or functional units: a data path unit 217, a parser 207 and a set of action machines 208.

The term 'unit' or 'module' are used, herein synonymously and refer to functional units of a software or hardware component of the network processor. Depending on the embodiment, a 'unit' may correspond to a physical unit, e.g. a particular hardware component or a program module, but it may likewise be the case that multiple functional units for one monolithic hardware block or software module or that functions of one functional unit are distributed among several, different hardware- or software modules.

The main function of the data path unit 217 is to expose data packets received from the RBB unit 214 to the parser 207. The admission unit 204, which is a component of the data path unit 217, controls which data packet, received from the RBB unit 214 is allowed to enter the data path and at what speed. The data path unit 217 ensures that the speed of the data packets entering the data path is in line with the data packet processing speed of the parser 207.

The main function of the parser 207 is to process (e.g. to analyze, inspect and manage) data packets received from the data path unit 217. The parser 207 decodes one or more fields of the packets in order to determine the packet format (i.e. the protocol used for storing and transmitting the data contained in a data packet). According to preferred embodiments, the parser 207 is implemented as software module and executed by one or more picoprocessors 218. The main objective of the parser 207 according to embodiments of the invention is to analyze the packet, and feed other network processor components, in particular packet queues and action machines 208, with the data packets, whereby the feeding depends on the result of said data packet analysis. The parser 207 is operable to read one or more rules stored in rules repository 215, load said rules into one or more registers of the processor executing the instructions of the parser 207 and to execute the loaded one or more rules on the data packet. According to the depicted embodiment, said one or more registers may be the registers of the picoprocessors 218.

According to embodiments of the invention, the parser 207 can be considered as finite state machine and the rules used by the parser 207 to analyze data packets can be considered as instructions determining when and how a state transition of said finite state machine occurs. The rules in rules repository 215, when executed by the parser 207, describe and determine how the parser 207 progresses through a set of different states. The rules in rules repository 215 according to embodiments of the invention allow the software-based parser 207 to be ran more efficiently on the preprocessors 218.

The third major component of the BPFC unit 201 is a set of action machines 208. The action machines 208 are hardware components, e.g. logic blocks being part of the network processor chip. According to some embodiments, said logic blocks may be implemented as ASICs. The action machines 208 are in charge of typical networking tasks such as providing for a MAC-filter or for virtual local area network (VLAN) filters, or for calculating an Internet protocol/transmission control protocol (IP/TCP) checksum.

Figure 3:
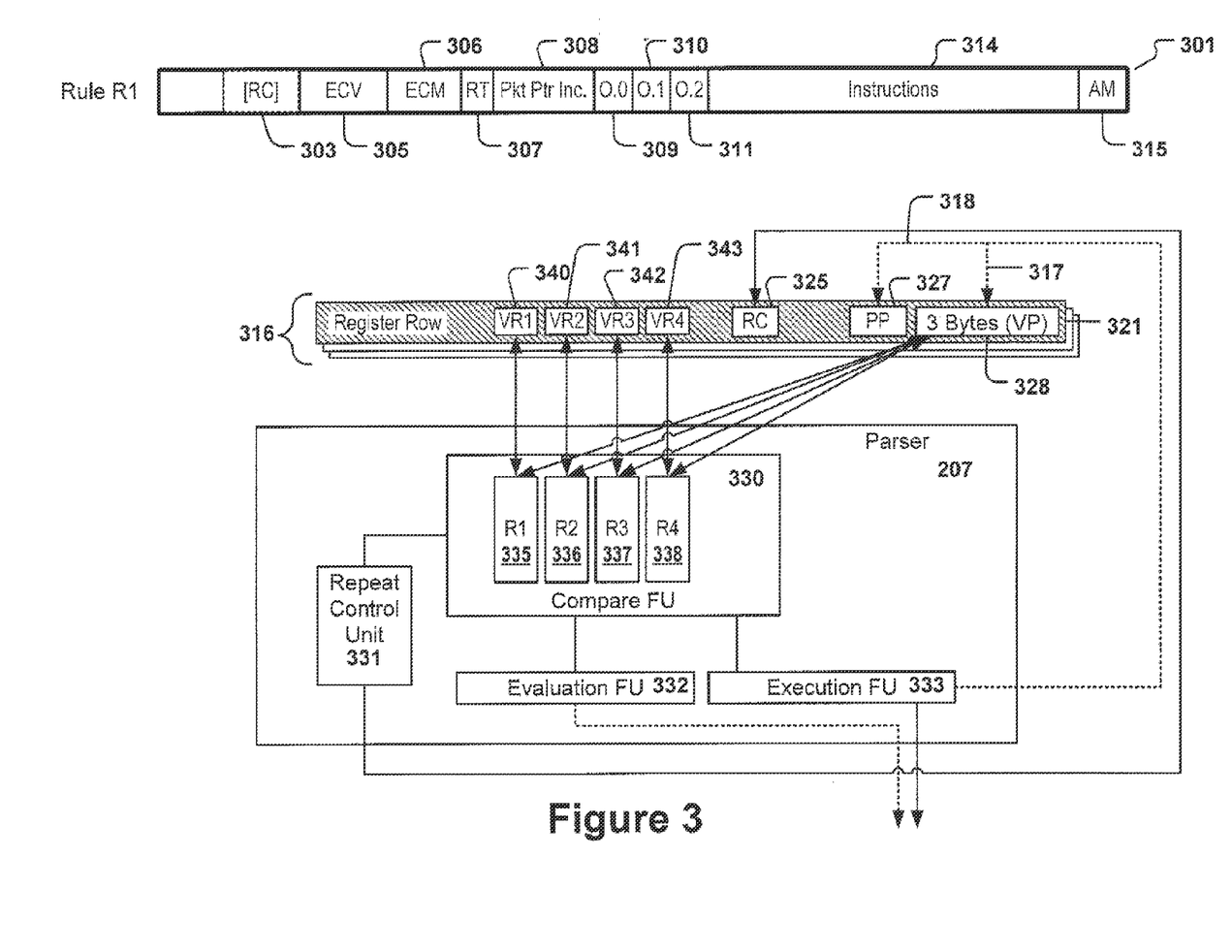
FIG. 3 depicts a rule and its usage by functional units of a parser.

FIG. 3 depicts in greater detail how the parser 207 and its functional units 330, 331, 332, 333 use loaded rules R1, R2, R3, R4 in order to process a data packet. An example of a rule R1 301 is depicted on top of FIG. 3 in greater detail.

The 'equality compare value' (ECV) field 305 comprises a data value to be compared with a data value of a data packet to be analyzed. The equality compare mask (ECM) field 306 specifies which parts of the data value stored in the ECV field 305 are masked and are therefore excluded from comparison with a data value of the data packet to be analyzed. For example, a bit value contained in bit position 3 of the ECM field 306 of rule R1 may determine that the bit value at bit position 3 of the ECV field 305 of said rule is ignored during comparison by compare functional unit (FU) 330. The data value of the data packet to be compared with each (masked) ECV field 305 of each loaded rule is loaded by the parser 207 into register section 328, which comprises, according to embodiments, exactly 3 bytes. The reading of said bits or bytes of the data packet into register section 328 is indicated by the dotted arrow 317.

According to some embodiments, the rules stored in the rules repository comprise a rule type RT 307 field. Said field is indicative of the type of the rule. A '0' bit may indicate that said rule is of 'normal rule type' and comprises complex instructions 314 to be executed by the parser 207 in normal operation mode while a '1' bit value of the RT field indicates that said rule is of 'repeat rule type' and that said rule comprises or is indicative of instructions to be executed repeatedly. A rule of 'repeat rule type' comprising a '1' bit in the RT field may be executed a first time in normal operation mode by the parser 207. In case the parser 207 determines in this first step that some repeat-instructions which may be part of field 314 of the rule need to be executed repeatedly, the parser 207 switches to repeat operation mode and (re)-executes said repeat-instructions.

According to embodiments, the main difference between repeat rules and normal rules is that a repeat rule comprises a repeat count (RC) field 303 while a normal rule does not. A repeat count field 303 comprises, depending on the embodiment of the invention and/or depending on each particular repeat rule,

- a numerical data value being indicative of the number of repeats the parser 207 has to execute while said repeat rule is loaded,
- a computer-interpretable code which is operable to dynamically determine the number of repeats to be executed by the parser 207 (for example, the parser may dynamically determine the number of 4-byte chunks of a data packet which have to be pushed to the action machines), or
- an identifier for a hardware routine which is part of the instruction set of the picoprocessors 218, whereby said hardware routine is operable to dynamically determine the number of repeats to be executed by the parser 207. According to embodiments, identifiers such as '3FFB', '3FFC', '3FFD', '3FFE', '3FFF' may each indicate an instruction of the picoprocessor 218 which is to be executed in case a rule comprising said identifier in its RC field is loaded. Said instructions '3FFB'-'3FFF' will be described in greater detail in the description of FIG. 4. According to some embodiments, said hardware routines may also comprise the repeat-instruction to be executed in combination with instructions for determining the number of repeats to be executed, e.g. instructions for evaluating a termination condition.

The picoprocessors 218 are processing units which execute, according to the depicted embodiment, the rule-based packet processing instructions of the parser 207.

A 'field' is a section of a data packet or of a rule comprising data and/or instructions. The boundaries of a field may be determined by the format of the data packet or rule, by the parsing schema of the parser 207 or a combination thereof.

The packet pointer increment field 308 and the offset fields 309, 310 and 311 of the rule 301 specify the position of the bits and bytes in an analyzed data packet which are to be extracted by the parser 207 and to be loaded into register section 328 for comparison in a succeeding working cycle in case the ECV field 305 data value of a currently loaded rule was determined to be equal to the bits or bytes of an analyzed set of bits and bytes of the data packet. For example, in case said comparison between bits and bytes of a data value loaded to the logical slot 335 equals the ECV field 305 data value of rule R1 301, the bits and bytes specified in fields 308-311 of said rule may be selected from the data packet by the parser 207 after having executed the comparison operation returning a positive result. Said selected bits and bytes may be pushed by the parser 207, e.g. to the action machines 208, and/or may be used by the parser 207 to execute further processing steps on said selected bits or bytes in a succeeding working cycle by another set of rules.

The slots 335-338 are logical slots of the compare FU 330 of the parser 207 which shall indicate that said compare FU 330 is operable to compare the ECV field 305 content of each of four loaded rules R1-R4 with one data value VP being stored in register section 328 in parallel. Said data value VP has been loaded from the data packet in a previous working cycle of the parser 207, whereby the bits and byte positions of the data value VP to be extracted were specified in the fields 308-311 of another rule having been successfully been compared to other bits and bytes of said data packet in a previous working cycle. The term 'successfully compared' hereby implies that comparing the (according to embodiments: masked) ECV field 305 of said of a rule is identical to a data value VP having been loaded into register section 328.

According to embodiments, register section 328 is part of a register row 321. Said register row 321 is an element of a register 316 of the one or more picoprocessors 218. According to embodiments, one such register may comprise e.g. 256 register rows. The picoprocessors 218 have access to data values being stored to one or more registers 316 without executing a further clock cycle.

Each slot 335-338 corresponds to one concurrently executed comparison operation. The compared 'data value' of the data packet may, but does not necessarily have to be a data value which represents a particular piece of coherent information. The compared data value VP of the data packet may be a set of several bits and bytes selected from a series of adjacent bits or bytes of the data packet or selected from a set of bits and bytes having been selected from different sections of the data packet.

According to embodiments of the invention, the data value VP is selected in a previously executed working cycle by the Execution FU 333 of the parser 207 from the data packet and loaded into register section 328. The ECV field values VR1-VR4 were derived from four different rules R1-R4 and are loaded into register sections 340-343 of the register 316. Said ECV field 305 contents are used for comparison with the VP data value having by the compare FU 330 of the parser 207. The ECV field values VR1-VR4 typically, but not necessarily, differ from each other for each of the loaded rules R1-R4.

The rule instruction field 314 comprises computer-interpretable instructions executed by one or more processing units, e.g. the picoprocessors 218, when the rule is executed. Said instructions specify which data packet processing and/or pushing steps have to be performed by the parser 207.

One or more destination action machine fields 315 specify to which action machine or type of action machine bits or bytes having been extracted from a data packet as a consequence of executing said rule and successfully comparing the ECV field 305 content of said rule with the VP value will be pushed to by the parser 207.

According to embodiments, the rules loaded by the parser 207 from the rules repository may be stored in a cache of the processing units executing instructions of the parser 207.

According to embodiments of the invention, the register 316 of the picoprocessors 218 storing all or a subset of the rules R1-R4 of the rules repository 215 may be implemented as SRAM storage module (static random access memory). SRAM is a fast and reliable memory type which is characterized by short access and cycle times and which is particularly suited for use as register of the picoprocessors 218, said picoprocessors 218 executing instructions of the parser 207.

One register (processor-internal memory) of said picoprocessors 218 is depicted in the form of a set of register rows. One register row 316 is shown in greater detail as hachured box 321. The boxes 340-343 are register sections comprising bits and bytes VR1-VR4 having been read from one or more rules R1-R4. The logical slots 335-338 indicate the ability of the comparison FU 330 to execute four comparison operations of data values VR1-VR4 having been derived from a set of currently loaded rules R1-R4 with bits and bytes VP in register section 328 in parallel. Data value VR1 was derived from rule R1 and is compared by the compare FU 330 of the parser 207 with the VP value read from the data packet. The comparison of four VR1-VR4 data values with the VP data values is indicated in FIG. 3 in the form of 8 double arrows.

According to some embodiments, the VR1 data value comprises only those bits and bytes of the ECV 305 field of the corresponding rule R1 which were not masked by the ECM field 306 of said rule.

The register section 325 comprises the number of repeats which need to be executed by the parser 207 given a particular set of rules R1-R4. The number of repeats has been determined by the parser 207, e.g. by reading the repeat count from an RC field 303 of the rule, by reading information stored in the data packet or by executing an instruction being operable to dynamically determine the repeat count. Said instruction may be part of one or more of the loaded rules or may be part of the instruction set of the picoprocessors 218.

Register section 327 comprises a packet pointer value being indicative of the first bit or byte of data of the data packet which needs to be processed in a succeeding working cycle. Said processing may comprise a pushing a chunk of data starting at said first bit or byte to a set of action machines. The updating of the packet pointer value stored in register row section 327 is indicated in FIG. 3 by dotted arrow 318.

According to embodiments, a packet pointer is a memory address being indicative of the exact start-bit or start-byte position of a set of bits or bytes in the data packet. Said bits or bytes are to be analysed or otherwise processed by the parser 207. Said packet pointer allows the parser 207 to read a particular set of bits or bytes from the data packet when said data packet is transferred in data path 217 to the parser 207 or when aid data packet has already reached the parser 207. According to embodiments, information on whether the analysed data packet is currently contained in the data path unit 217 or in the parser 207 is made available for the parser 207 by other components of the network processor (not shown), so that the packet pointer itself may merely contain an indicator of the relative bit or byte position of the currently examined data of the data packet to be used for analysis and/or processing, e.g. position information relative to the start-bit or byte of the data packet. A processing operation would be, for example, pushing said set of bits or bytes to one or more action machines.

Register section 328 comprises a set of bits or bytes of a predefined length, e.g. 3 bytes, which were extracted from the data packet in dependence on a comparison result provided by the compare FU 330. Said extracted data values are used as input for the compare FU 330 in the succeeding working cycle.

Each of the slots 335-338 of the parser 207 corresponds to a loaded rule, each rule comprising instructions 314. Said instructions are to be executed on a data packet by the picoprocessors 218. According to the depicted embodiment, the picoprocessors 218 are capable to execute 4 instructions, i.e. 4 sections or extensions of rules R1-R4, in parallel.

According to preferred embodiments, only instructions 314 contained in that very loaded rule which was successfully matched against the VP data value are executed. The instructions contained in all other loaded rules are not executed on the data packet. Said executed instruction may comprise, for example, instructions triggering the loading of anew set of rules to be used in a comparison step of a succeeding work cycle. Correspondingly, only those action machines are used e.g. during chunk pushing which are specified in section 315 of that very rule having been matched successfully with the VP data value, and only those bits and bytes are read from the data packet for comparison in a succeeding work cycle which are specified in fields 308-311 of the successfully matching rule.

Each of the functional units 330, 331, 332, and 333 may be implemented as hardware- or software component of the parser 207 or any combination thereof. Said components 330-333 may be physically separated or may be part of one single monolithic block of software.

According to preferred embodiments, however, all functional units of the parser 207 and the parser 207 itself are implemented completely or at least partially in the form of hardware, i.e. as processing logic specified by the picoprocessors 218, while the flexibility of the parser 207 is provided by the instructions contained in the rules loaded to the parser 207. The instructions of said rules are, according to preferred embodiments, computer-interpretable instructions written in a programming language. Said instructions can easily be changed according to new requirements and provide for a highly flexible parser 207.

The compare functional unit (FU) 330 is operable to execute multiple compare operations ("equality compare") in parallel. In the depicted embodiment, four compare operations are executed by the compare FU 330 in parallel. The rules R1-R4 may differ from each other.

At first, a set of bits or bytes is extracted from an analyzed data package by the parser 207. According to preferred embodiments, the size and location of said extracted bits or bytes is specified in a loaded and previously successfully matching rule in sections 308-311. The extracted bits or bytes VP are stored to data register area 328. The compare unit 330 loads the ECV values VR1-VR4 of the loaded rules R1-R4 into register sections 340-343 and compares each of said values VR1-VR4 in a respective logical slot 335-338 of the parser 207 with data value VP. According to preferred embodiments, each rule comprises in addition an equality compare mask (ECM) field 306. Said ECM field 306 indicates which bits and bytes VR1-VR4 of a each of the four rules R1-R4 loaded to register areas 340-343 to be compared with a loaded data value VP of the data packet should be ignored ("masked") during the analysis of a data packet. For example, the rule R1 may cause a parser to load 3 particular bytes of data into the register area 340 for equality comparison. The ECM field 306 of R1 may specify that only two of said 3 bytes shall be actually used for comparison while the other bits are masked.

According to preferred embodiments, the comparison is implemented as a 'comparison for equality'. Said comparison returns a binary result value for each of the four logical compare slots of the compare FU 330 of the parser 207, wherein a first result type confirms equality of the compared bits or bites while a second result type is indicative of unequal data values.

In the depicted embodiment, the analysis information consists of a 4 bit data value. For each of the four comparison slots of the compare FU 330 of the parser 207, one bit ('equal' or 'not equal') is returned. For example, by loading an NH header field of a data packet into the register section 328 of the register row 321 of the picoprocessors 218, by comparing the data content VP of said loaded field with a rule R1 comprising the data value '06' in its ECV field 305, a comparison result, also referred to as 'analysis result', indicating equality between the '06' value and the NH packet header field indicates that the analyzed packet is formatted according to the TCP protocol.

Depending on said analysis result—i.e. the identity of the ECM field 306 content of rule R1 to said selected bits or bytes of an analyzed data packet—the evaluation FU 332 extracts from the analyzed data packet information required by the execution FU 333 in the current working cycle and/or extracts from the analyzed data packet information required by comparison FU 330 in the succeeding working cycle.

According to the depicted example, the evaluation FU 332 receives a 4-bit analysis result value from the comparison FU 330, and processes said analysis result in order to determine if and which bits or bytes need to be extracted from the analyzed data packet and/or which rules need to be loaded for further processing or analyzing the data packet. According to the given example, in case the evaluation FU 332 determines that the analyzed data packet is a TCP packet (i.e. a data packet comprising at least a TCP header section), the evaluation FU 332 may initiate the loading of a new set of rules being particularly suited for analyzing and/or processing TCP data packets. According to the depicted embodiments, the new set of rules comprises one rule for each of the compare slots of the compare FU 330 of the parser 207.

In case a rule comprises instructions which need to be executed on a data packet independently of the analysis result, said instructions are, according to embodiments, executed by the parser 207 in parallel to the data packet analysis executed by the compare FU 330. For example, in case some bits or bytes of the packet header need to be pushed by the parser 207 to the action machines irrespective of the analysis result generated by the compare FU 330 (e.g. irrespective of the question which format or protocol the data packet is based on), the parser 207 may push said bits or bytes to the action machines and execute the analysis as described in parallel. Depending on the data packet analyzed and the rules loaded, the parser 207 may execute a data packet analysis step involving the compare FU 330 and a pushing step involving the execution FU 333 in parallel. In some embodiments and some processing scenarios, the parser 207 may execute a pure analysis step or execute a pure pushing step. Rules which fulfill pure pushing purposes may not comprise an ECV field 305 and ECM field 306 or may comprise an ECM field 306 completely masking the data values of the ECV field 305.

The repeat control unit 331 is in charge of determining the number of repeats to be executed by the parser 207. Said determination is based on data contained in the loaded rules and/or in the processed data packet. The evaluation functional unit 332 is operable to evaluate the comparison result (i.e. the analysis result of a rule applied on said data packet) provided by the compare FU 330. Based on said result the evaluation FU 332 determines one set of rules which need to be loaded in a future working cycle, determines which bits or bytes of data of the data packet need to be read for analysis/comparison in said succeeding working cycle and determines which actions need to be performed on the data packet in the current working cycle. Such actions could be, for example, pushing byte chunks to the action machines.

The execution functional unit (FU) 333 is operable to execute actions such as pushing byte chunks of an analyzed data packet to the action machines. Depending on the embodiment, it may have been determined necessary in the current working cycle that executing an action, e.g. pushing chunks of data to the action machines, is necessary.

Figure 4:
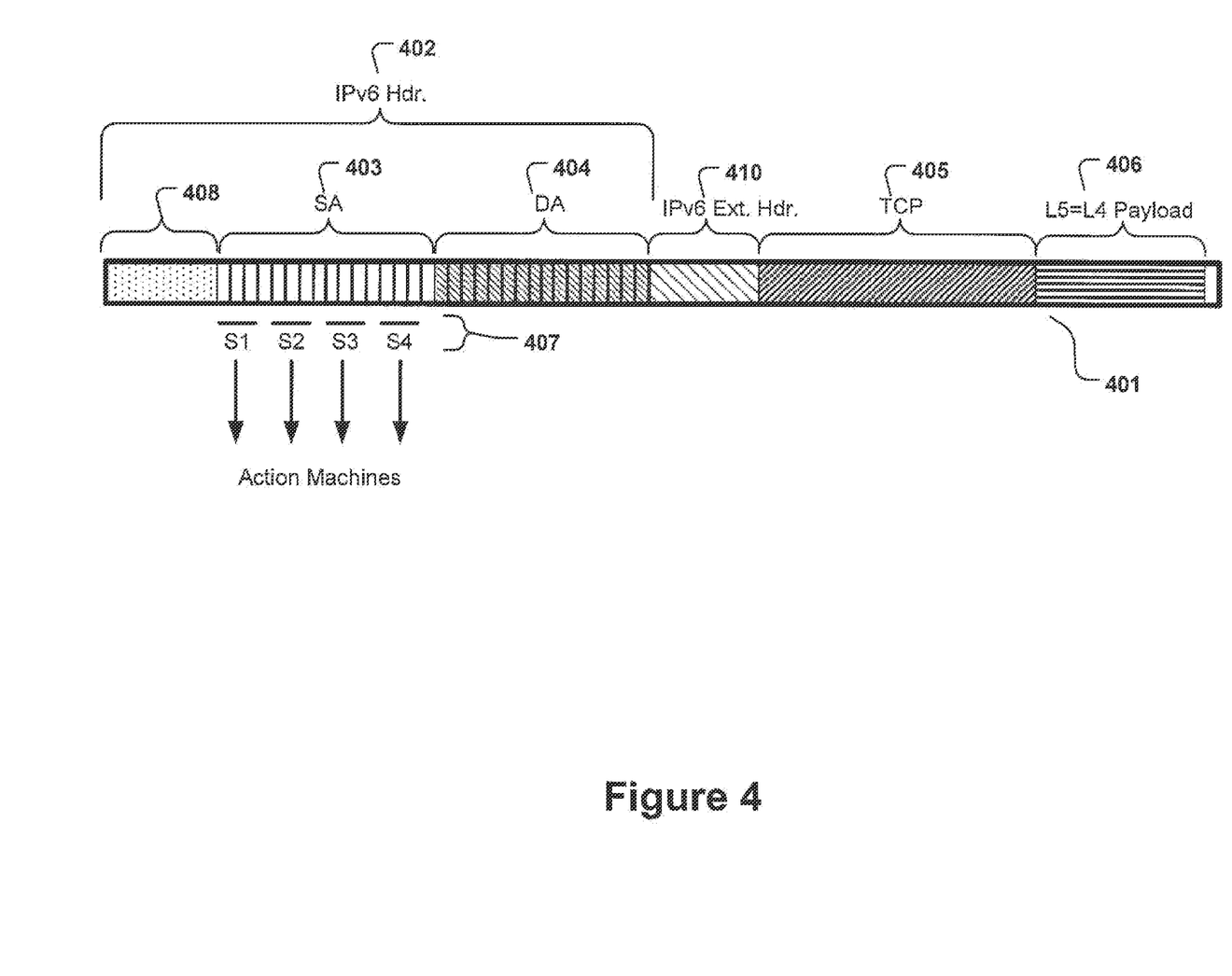
FIG. 4 depicts the structure of an IPv6 data packet.

FIG. 4 depicts a data packet 401 conforming to the IPv6 protocol. The data packet 401 comprises an IPv6 header 402. The IPv6 header 402 comprises a first section 408 which comprises several fields such as 'IP version', 'services', 'traffic class', 'flow label', 'payload length', 'hop limit' (HL) and a 'next header' (NH) field (not shown). The IPv6 header 402 further comprises a source address field SA 403 of 16 bytes (128 bit) and a destination address field DA 404 of 16 bytes (128 bit). The data packet 401 may comprise 0, 1 or several IPv6 extension headers 410 (FIG. 4 shows a data packet with one IPv6 extension header). The data packet 401 further comprises a TCP header 405 of 20-60 bytes, and an L5 ('level 5') section 406 which is an L4 payload section.

The NH field indicates the type of the next header to come in the data packet 401. In case the header to come is of TCP format, said NH field has the value '06'. Said NH data field can be evaluated by one or more rules of the parser and can be used for calculating an analysis result and to take a parsing decision.

The network layer (L3) defines logical addressees associated with a specific protocol to decide how to transmit data between network devices. The set of protocols used in this layer comprises IP, ICMP, ARP, RIP, OSI, IPX and OSPF.

'L4' is the fourth layer of the OSI model and is also referred to as 'transport Layer'. This layer mainly provides services for data transfer and segmentation of upper layer data. Transport Layer (L4). L4 data transfer may be based e.g. on the TCP or UDP protocol. Further L4 protocols exist such as SPX, NETBIOS, ATP and NWLINK. According to other embodiments of the invention, the parser is operable to execute rules which can evaluate and process data packets comprising data formatted according to said L4 protocols.

The Session Layer (L5) manages and handles the creation, maintenance, and teardown of communications between those two hosts.

The IPv6 header 402 and the optional IPv6 extension header(s) 410 therefore correspond to the 3rd layer of the OSI model. The TCP header 405 and the L4 payload section 406 belong to the 4th OSI layer. The payload section 406 comprises data belonging to the 5th OSI level which may comprise an L5 header section and an L5 payload section (not shown). The described data packet is an example for a data packet comprising multiple nested data layers, whereby the payload section of a first data layer comprises an envelope section (e.g. a header section) and a payload section of a second data layer.

The SA field 403 is indicative of the source address, i.e. the address of the sender of the packet while the DA field is indicative of the destination of the packet, i.e. the proposed receiver of the packet.

In case the parser needs to push the data content of the SA field 403 to the action machines, there exists the restriction that the number of bytes which can be received by the action machines per moment of time is limited. According to the depicted embodiment, the maximum number of bytes which can be received per transaction by the action machines is 5 byte. As the SA field 403 comprises 16 byte, said SA field 403 is too big to be pushed to the action machines in one transaction. Rather, the SA field 403 needs to be split into at least 4 byte chunks 407 S1-S4. Each byte chunk is 4 bytes long and can be pushed to the action machines in one transaction respectively.

The pushing of byte chunks contained in a data packet to the action machines is a typical but in no way limiting example for tasks which need to be performed repeatedly by network processors.

Assuming one transaction corresponds to one working cycle of the network processor, state of the art network processors would require 8 working cycles for pushing said 4 byte chunks to the action machines: for the pushing of each of the 4 byte chunks, two working cycles would be needed: one first working cycle for loading instructions (e.g. in the form of rules) into the register of the picoprocessors 218 and a second working cycle for executing the loaded instructions (e.g. pushing data chunks) would have been required. According to the present invention, the first cycle corresponding to the loading of the pushing instructions need to be executed only once, thereby avoiding loading the pushing instructions repeatedly. According to the present invention, one first working cycle for loading the pushing instruction and 4 additional working cycles for executing the loaded pushing instruction for each of the four byte chunks would be required. The ratio of 8:5 working cycles (which would be even more impressive in case more than 4 byte chunks would have been pushed to the action machines) clearly shows that embodiments of the present invention tremendously speed up network processors without requiring hardware with higher clock cycles. Accordingly, the idea behind the depicted embodiment of the invention can likewise be expressed as providing for a parser being operable to execute a repeat task, e.g. the pushing of chunks of data to action machines, without changing the state of the parser and by consuming only one working cycle per repeatedly executed operation.

According to preferred embodiments, the parser proceeds with the processing of the data packet from the left to the right. In case the parser executes a rule comprising a repeat count field, said repeat count field may comprise the following identifiers:

Identifier '3FFB' indicates that an instruction of the picoprocessors should be executed which can be rephrased as 'push byte chunks of an IPv6 extension header 410 of an analyzed data packet until the last byte position of said IPv6 extension header 410 of said packet is reached;

Identifier '3FFC' indicates that an instruction of the picoprocessors should be executed which can be rephrased as 'push byte chunks of the TCP header 405 of an analyzed data packet until the last byte position of said TCP header 405 of said packet is reached;

Identifier '3FFD' indicates that an instruction of the picoprocessors should be executed which can be rephrased as 'push byte chunks of a Layer 4 Payload 406 of an analyzed data packet until the last byte position of said Layer 4 Payload 406 of said packet is reached;

Identifier '3FFE' indicates that an instruction of the picoprocessors should be executed which can be rephrased as 'push byte chunks of an IPv4 header of an analyzed data packet until the last byte position of the IPv4 header of said packet is reached;

Identifier '3FFF' indicates that an instruction of the picoprocessors should be executed which can be rephrased as 'push byte chunks of an analyzed data packet until the last byte position of said packet is reached; said instruction acts as 'fallback' instruction which can be executed even in case the format (e.g. protocol) of the packet was not recognized by the parser. The parser proceeds through the data packet from left to right and pushes byte chunks to the action machines until the end of the data packet is reached.

According to preferred embodiments, the instructions indicated by said identifier of the repeat count field of some rules belong to the instruction set of the picoprocessors on which the parser is operating. This is highly advantageous as said instructions are an integral part of the picoprocessors and no reading or loading step is required in order to make available said instructions during the operation of the parser. This increases speed by avoiding additional working cycles for loading said instructions.

The repeat count field of a rule may comprise an identifier of an instruction to determine the repeat count dynamically whereby said instruction is part of the instruction set of the processors (e.g. picoprocessors) on which the parser is operating. According to embodiments, the parser has different options to determine the number of repeats to be executed. According to other rules or other embodiments, said number is read from the repeat count field of a rule, from a field of the analyzed data packet or is determined dynamically by executing a program routine being implemented as part of or as extension of a loaded rule. In case said instructions are implemented as part of or extension or part of a loaded rule, an additional step for loading instructions for determining the repeat count can be avoided. This feature speeds up the parser speed for the same reason as rules comprising an RC field with an identifier of an instruction belonging to the instruction set of a processor: no extra loading step for loading instructions for determining the repeat count is necessary.

Figure 5A:
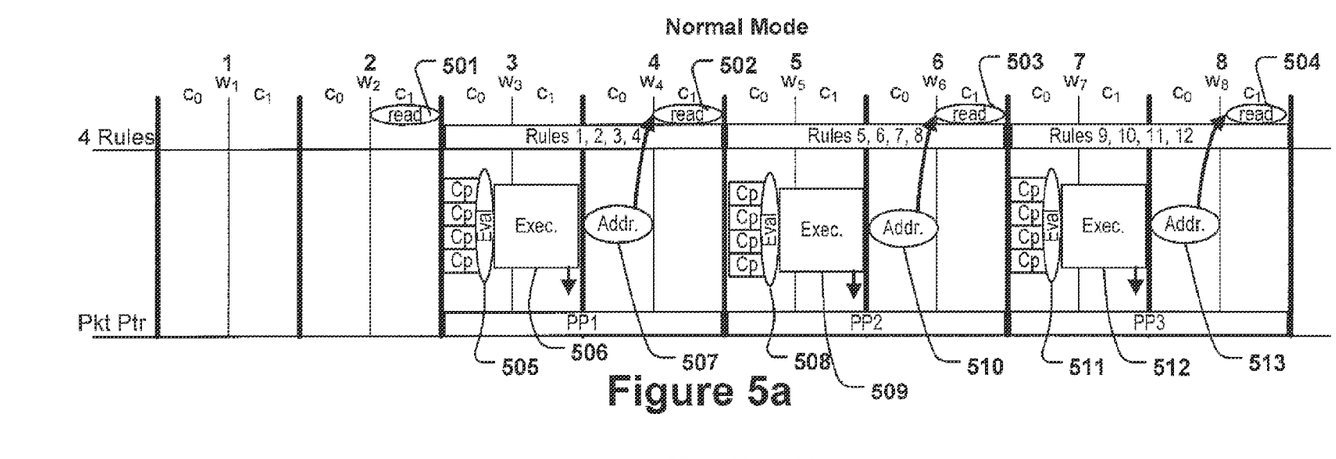
FIG. 5 is an illustration of 8 working cycles in normal operation mode and repeat operation mode.

FIG. 5a depicts 8 working cycles operated by the parser according to embodiments of the invention in normal operation mode. The '4 Rules' line indicates the set of rules currently loaded and executed. Each slot of the compare FU unit executing a comparison operation on data sections of a data packet of the parser corresponds to one rule. According to the depicted embodiment, each rule set comprises 4 rules. The PP1, PP2, PP3 and PP4 (FIG. 5b) bars indicate changes of the packet pointer, PP1 indicates a packet pointer pointing to a first data section of a data packet; PP2 indicates that said packet pointer has changed its value and now points to a second data section of said data packet and so on.

In a first working cycle (e.g. w3) the parser may execute tasks such as comparing data sections of the packet with data in the ECV field of each currently loaded rule, selecting other data sections of the data packet for analysis or other kinds of processing in a future working cycle and/or executing a (repeat) instruction such as pushing byte chunks to the action machines. In the next working cycle (e.g. w4), the parser reads a rule from the rules repository. The requirement of at least two different working cycles (one for loading instructions and one for executing the loaded instructions) is typical for many current network processors.

According to embodiments, a working cycle is a sequence of steps which, when executed, may lead to a state transition of a finite state machine, e.g. the parser. According to the embodiment depicted in FIG. 5a, 2 working cycles are required by the parser to perform a state transition, e.g. w3 and w4.

In FIG. 5a, a parser working in normal operation mode is depicted. The Arabic numbers 1-8 on top of the figure indicate the current working cycle, each working cycle comprising a first clock cycle $C_0$ and a second clock cycle $c_1$, the length of each clock cycle being determined by the type of the clock 120 of the network processor.

In the second working cycle $w_2$, a first rule set comprising rules 1, 2, 3 and 4 is read in step 501 by the parser and loaded into one or more registers 316 of the picoprocessors. Said loaded rule set is used in the $3^{rd}$ working cycle $w_3$ by the parser to execute comparison operations, to select data sections from the data packet for future processing steps and/or for executing repeated tasks such as pushing byte chunks to action machines. The comparison operations are indicated as four Cp boxes which correspond to the four parallel compare operations executed by the compare unit 330 of the parser according to FIG. 3. The selection of data sections for further processing based on the result of said comparison is indicated in FIG. 5a by the ellipse 'Eval' 505. Said 'Eval' operation is executed by the functional unit 332 of FIG. 3. Executing an instruction, e.g. a repeat-instruction such as pushing a data chunk to the action machines, is performed in the $3^{rd}$ working cycle in an 'Exec' step 506. Said 'Exec' step 506 is executed by the execution FU 333 of FIG. 3. According to the depicted embodiment, the 'Exec' step 506 comprises pushing a byte chunk to the action machines as indicated by the arrow at the bottom of box 506. After having pushed said byte chunks to the action machines, the packet pointer changes its value (transition PP1→PP2).

The step 505 and/or step 506 comprises a parsing decision, because depending on the result of the analysis of the data packet (in this case: depending on the result of the a comparison of data values of the data packet with data values of the rule) different operations may be performed by the parser in step 506 and a different set of rules may be determined to be required for execution in a future working cycle ($w_5$).

In the first clock cycle of the $4^{th}$ working cycle $w_4$, the location (i.e. memory address) of the next set of rules to be loaded is determined in the 'Addr.' step 507 and said set of rules is read in step 502 from the rules repository.

In working cycle $w_5$ the comparison operations, bit- or byte selection operation and further operations 508, 509 are performed based on a new set of rules 5, 6, 7 and 8 as described for working cycle $w_3$. The rule set loaded in c1 of working cycle 4 and used in $w_5$ are 'normal rules' operable to take a parsing decision in dependence on the analyzed data packet and/or other factors.

In read of step 503 of working cycle $w_6$, step 510, the address of a new set of rules 9, 10, 11 and 12 is determined and said rules are read in the second clock cycle of working cycle 6 into the one or more registers 316. After having executed step 509, the packet pointer changes its value as indicated by the new symbol PP3. In the $7^{th}$ working cycle $w_7$, the loaded rules 9-12 are used to execute comparison, evaluation and/or data section, step 511, manipulation tasks as described beforehand. In working cycle $w_7$ a parsing decision is taken based on the analysis of the data packet, whereby said parsing decision comprises a decision that rules 13-16 are required for future working cycles (not shown). Said determined rules are read, step 504, from the memory address, step 513, in working cycle 8.

The 8 working cycles $w_1$-$w_8$ depicted at the top of FIG. 5a are executed, step 512, by the parser in normal operation mode. In normal operation mode, a first working cycle $w_2$, $w_4$, $w_6$, $w_8$ is required for reading rules into the one or more registers 316. A second working cycle $w_3$, $w_5$, $w_7$ is required to execute the read and loaded rules, thereby taking a parsing decision e.g. on how to process the data of the analyzed data packet and/or on the question which set of rules to load and use in the succeeding working cycle.

Figure 5B:
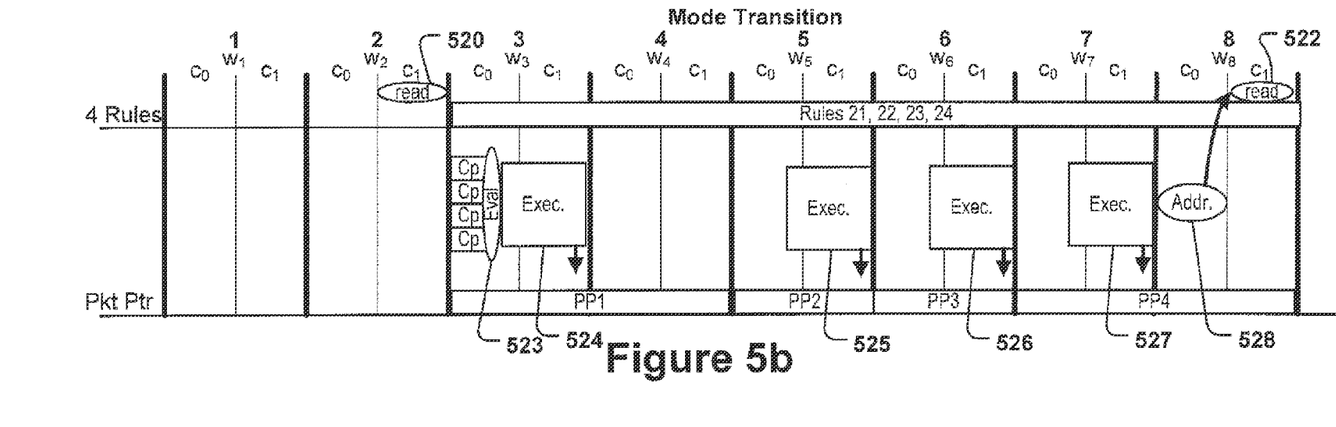

The working cycles depicted in FIG. 5b show the 'transition' or 'switching' of the parser from working in normal operation mode (in working cycles $w_1$-$w_4$) to working in repeat operation mode (in working cycles $w_5$-$w_7$). In working cycle $w_8$ of FIG. 5b, the parser operates in normal operation mode again.

The set of rules 21, 22, 23, 24, read in step 520 and executed in $w_3$ of FIG. 5b is of repeat rule type and comprises a repeat count field. In working cycle $w_3$ a parsing decision is taken in one of the steps 523, 524 based on an analysis result, and an action is performed in step 524. In working cycle $w_4$ of FIG. 5b, the parser determines that a repeat-instruction has to be executed. As said repeat-instruction is already loaded to the one or more registers (e.g. as part or extension of the loaded rule(s) 21-24) or is part of the picoprocessor instruction set, a loading of repeat-instructions is not necessary and nothing needs to be done in working cycle $w_4$. Rather, the parser switches to repeat operation mode wherein the repeat-instructions as indicated by the 'Exec' boxes can be executed in steps 525, 526 and 527 in each succeeding working cycle compared to only every second working cycle $w_3$, $w_5$, and $w_7$ as was the case for the normal operation mode (see FIG. 5a). As a consequence, each single working cycle $w_5$, $w_6$ and $w_7$ depicted in FIG. 5b in repeat operation mode executes repeat-instructions, e.g. pushes a byte chunk to the action machines as indicated by the arrow at the bottom of the 'Exec' boxes, thereby doubling the speed of the network processor compared to normal operation mode. When all repeat-instructions have been executed (the number of repeats is directly or indirectly specified e.g. in the repeat count field of a repeat rule or in the data packet analyzed/processed), the parser switches back to normal operation mode and loads a new set of rules in steps 528 and 522 of working cycle $w_8$. Said newly loaded rules are used in working cycle $w_9$ (not shown).

It shall be explicitly mentioned here that the ratio of clock cycles to working cycles depends on the network processor hardware used in each individual embodiment. The embodiments described in FIG. 5a, 5b wherein one working cycle corresponds to two clock cycles should therefore be considered as mere design choice and should not be considered as limiting the present invention to the ration of working cycles to clock cycles described in various embodiments of this invention.

Figure 6:
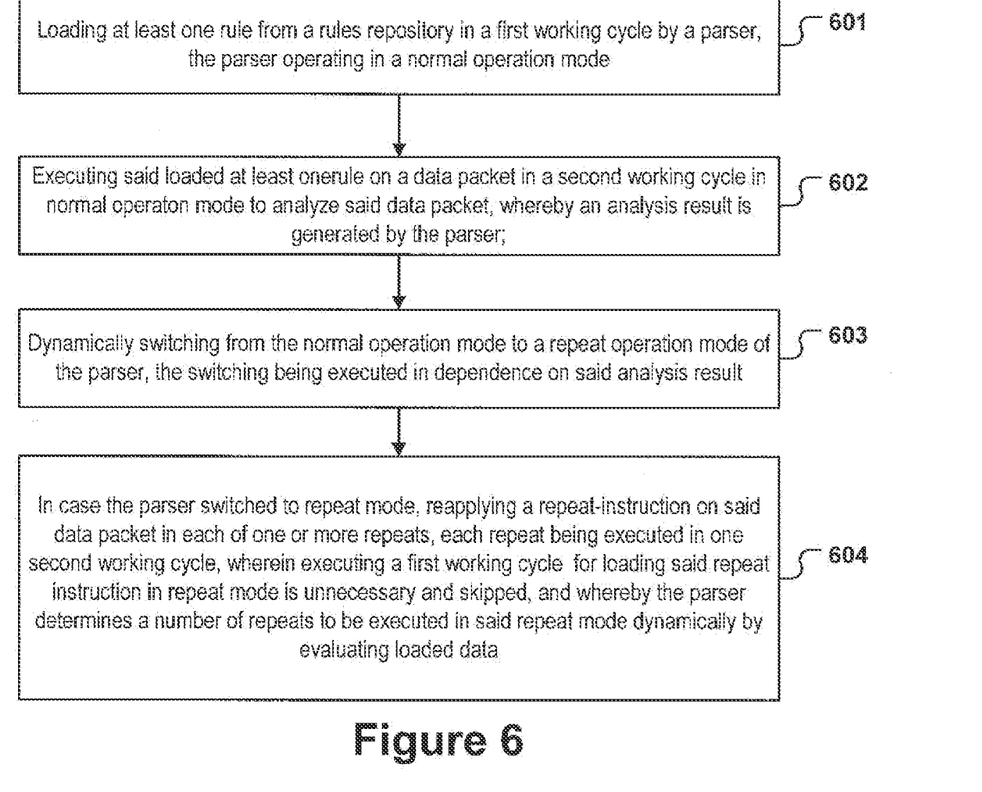
FIG. 6 is a flowchart of a method of operating a network processor.

FIG. 6 depicts a flowchart of a method for operating a network processor according to embodiments of the invention. In step 601, at least one rule is loaded from a rules repository in a first working cycle by a parser working in normal operation mode. In step 602, said at least one loaded rule is executed in a second working cycle in normal operation mode to analyze said data packet and to generate an analysis result. In dependence on said analysis result, the parser may switch in step 603 dynamically from normal operation mode to repeat operation mode. In case the parser switched to repeat operation mode in step 603, a repeat-instruction is applied on said data packet in each of one or more repeats. Each of said repeats is executed in one second working cycle, wherein executing a first working cycle for loading said repeat-instruction in repeat operation mode is unnecessary. The parser determines the number of repeats to be executed in said repeat operation mode dynamically by evaluating loaded data. Said 'loaded data' is data having already been loaded by the parser at the time of entering repeat operation mode. In case the parser switched to repeat mode, the parser in step 604 (re-)applies a repeat-instruction on said data packet in each of one or more repeats. Each repeat is executed in one second working cycle, whereby executing the first working cycle for loading said repeat-instruction in repeat mode is unnecessary and not executed. The parser determines the number of repeats to be executed in said repeat mode dynamically by evaluating loaded data, e.g. by evaluating one or more loaded rules, by evaluating the analyzed data packet or a combination thereof.

Figure 7:
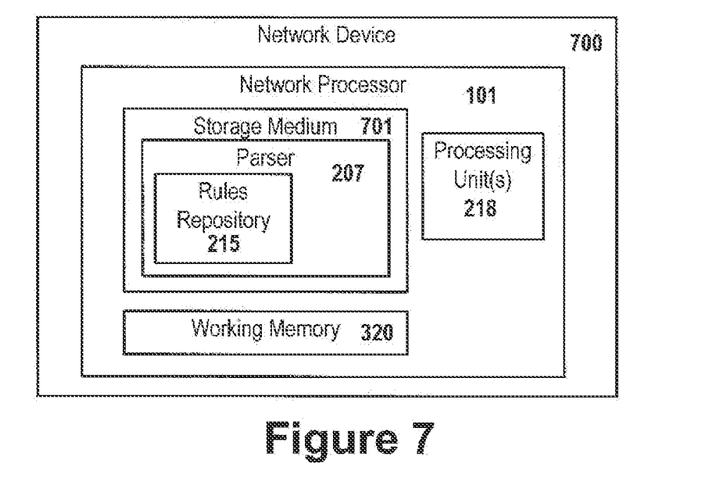
FIG. 7 is a block diagram of a device comprising a network processor.

FIG. 7 depicts a block diagram of a device 700, e.g. a network router or switch, comprising a network processor 101 according to embodiments of the invention. The network processor comprises a non-transitory, computer-readable storage medium 701 and one or more picoprocessors 218. The storage medium 701 comprises computer-interpretable instructions which, when executed by the one or more picoprocessors 218 provide for a method of operating a network processor according to any of the embodiments of the invention described beforehand.

While the computer-readable non-transitory storage medium 701 is shown in an exemplary embodiment to be a single medium, the term "machine-readable medium" should be taken to include a single medium or multiple media (e.g., a centralized or distributed database, and/or associated caches and servers) that store the one or more sets of instructions. The term "computer-readable non-transitory storage medium" shall also be taken to include any medium that is capable of storing or encoding a set of instructions for execution by the parser that cause the parser to perform any one or more of the methodologies of the present invention, or that is capable of storing or encoding rules utilized by said parser. The term "computer-readable non-transitory storage medium" shall accordingly be taken to include, but not be limited to, solid-state memories, optical and magnetic media, etc. such as, but not limited to, any type of disk including floppy disks, optical disks, CD-ROMs, and magnetic-optical disks, read-only memories (ROMs), random access memories (RAMs), magnetic or optical cards, or any type of media suitable for storing electronic instructions.

The invention claimed is:

1. A network processor, comprising:
a rules repository, the rules repository comprising a plurality of rules, each rule in the plurality of rules comprises a set of fields encoded in the rule identifying characteristics of the rule, wherein the plurality of rules of the rules repository comprise rules of at least a first rule type and a second rule type, a rule type of each rule being indicated in a rule type (RT) field in the set of fields encoded in the rule identifying the characteristics of the rule, wherein each rule of the first rule type is executed by the parser in normal operation mode, and wherein each rule of the second rule type is executed by the parser in normal operation mode when the rule is executed for the first time after the rule has been loaded to one or more registers of one or more processing units executing instructions of the parser and is executed in repeat operation mode when the rule is executed in an $m_{th}$ repeat time, m being an integer larger 1; and
a parser, executed by one or more processing units in the network processor, being operable to work at least in a normal operation mode and in a repeat operation mode,
wherein the parser in the normal operation mode loads at least one first rule from the rules repository in a first working cycle and executes an instruction of the loaded at least one first rule on a data packet in a second working cycle, wherein the at least one first rule being executed by the parser for analyzing the data packet, and wherein an analysis result is generated;
wherein the parser in the repeat operation mode loads the at least one first rule from the rules repository in a first working cycle, executes the instruction of the loaded at least one first rule on the data packet in the second working cycle, and reapplies the instruction on the data packet in each of one or more repeats in one or more subsequent working cycles;
wherein the parser is operable to dynamically switch from normal operation mode to repeat operation mode in dependence on the analysis result; and
wherein the parser dynamically determines a number of the one or more repeats from a repeat count (RC) field in a set of fields encoded in the at least one first rule identifying characteristics of the at least one first rule.

2. The network processor of claim 1, further comprising:
one or more action machines for processing the data packet, wherein executing the instruction in repeat operation mode comprises pushing one or more parts of the data packet to the one or more action machines wherein the one or more action machines are identified in an action machine (AM) field in the set of fields encoded in the at least one first rule identifying the characteristics of the at least one first rule.

3. The network processor of claim 1, wherein the instruction in the repeat operation mode is implemented as part of the loaded at least one first rule or as an extension to the loaded at least one first rule.

4. The network processor of claim 3, wherein the loaded at least one first rule comprises a rule type identifier in a rule type (RT) field in the set of fields encoded in the at least one first rule identifying the characteristics of the at least one first rule.

5. The network processor of claim 1, wherein the at least one first rule comprises an equality compare mask (ECM) field and an equality compare value (ECV) field in the set of fields encoded in the at least one first rule identifying the characteristics of the at least one first rule, wherein the equality compare value (ECV) field comprises first bits of data to be compared with second bits of data read from a particular position of the data packet, wherein the first bits of data contained in the equality compare value (ECV) field are excluded from comparison with the second bits of data from the particular position of the data packet if third bits at corresponding positions in the equality compare mask (ECM) field prescribe a masking of the first bits of data contained in the equality compare value (ECV) field, and wherein the a particular position of the data packet are identified by a packet pointer field and one or more offset fields in the set of fields encoded in the at least one first rule identifying the characteristics of the at least one first rule.

6. The network processor of claim 1, wherein determining the number of one or more repeats to be executed by the parser is executed before or at the moment when the parser starts executing the instruction in repeat operation mode.

7. The network processor of claim 1, wherein the number of one or more repeats is determined by the parser executing a program routine, the program routine being selected from the group comprising:
program code forcing the parser in repeat operation mode to execute the instruction until the last byte position of a predetermined section of the data packet is reached by the parser;
program code forcing the parser in repeat operation mode to execute the instruction until the last byte position of an IPv4 header is reached by the parser;
program code forcing the parser in repeat operation mode to execute the instruction until the last byte position of an IPv6 extension header is reached by the parser;
program code forcing the parser in repeat operation mode to execute the instruction until the last byte position of a TCP header is reached by the parser;
program code forcing the parser in repeat operation mode to execute the instruction until the last byte position of a Layer 4 payload is reached by the parser; or
program code forcing the parser in repeat operation mode to execute the instruction until the last byte position of the analyzed data packet is reached.

8. The network processor of claim 5, wherein at least one protocol to be used to forward or process the data packet is identified by comparing data contained in a header field of the data packet with data contained in the equality compare value (ECV) field in the set of fields encoded in the loaded at least one first rule identifying the characteristics of the at least one first rule.

9. The network processor of claim 1, wherein the data packet comprises two or more nested data layers, each data layer consisting of an envelope and a payload section, wherein the payload section of a first data layer comprises the envelope and payload section of a second data layer, and wherein at least one second rule to be loaded and being operable to process the data contained in the second data layer is determined by the parser by executing the at least one first rule on data values being contained in the envelope of the first data layer.

10. The network processor of claim 1, wherein the parser, during execution of the instruction in the repeat operation mode, is operable to read and use packet pointers which are dynamically updated during the execution of the instruction and wherein each packet pointer points to a begin of a section of data of the data packet to be processed in one repeat by the instruction in the repeat operation mode.

11. The network processor of claim 10, wherein each packet pointer points to a first bit of a set of adjacent bits in the data packet, and wherein, for each repeat executed by the parser, one of the set of adjacent bits is transferred to one or more action machines.

12. A computer program product comprising a computer-readable non-transitory storage medium comprising instructions which, when executed by a processing device, causes the processing device to:
loading, by a parser operating in a normal operation mode, at least one rule from a rules repository in a first working cycle, the rules repository comprising a plurality of rules and each rule in the plurality of rules comprising a set of fields encoded in the rule identifying characteristics of the rule, wherein the plurality of rules of the rules repository comprise rules of at least a first rule type and a second rule type, a rule type of each rule being indicated in a rule type (RT) field in the set of fields encoded in the rule identifying the characteristics of the rule, wherein each rule of the first rule type is executed by the parser in normal operation mode, and wherein each rule of the second rule type is executed by the parser in normal operation mode when the rule is executed for the first time after the rule has been loaded to one or more registers of one or more processing units executing instructions of the parser and is executed in repeat operation mode when the rule is executed in an $m_{th}$ repeat, m being an integer larger 1;
executing, by the parser operating in the normal operation mode, an instruction of the at least one loaded rule on a data packet in a second working cycle by the parser, wherein the parser thereby analyzes the data packet and generates an analysis result;
dynamically switching, by the parser, from the normal operation mode to a repeat operation mode, the switching being executed in dependence on analysis result; and
responsive to the parser switching to repeat operation mode, reapplying, by the parser in the repeat operation mode, the instruction on the data packet in each of one or more repeats in one or more subsequent working cycles, and wherein the parser dynamically determines a number of the one or more repeats from a repeat count (RC) field in a set of fields encoded in the at least one first rule identifying characteristics of the at least one first rule.

13. The computer program product of claim 12, wherein the instructions further cause the processing device to:
process, by one or more action machines, the data packet, wherein executing the instruction in repeat operation mode comprises pushing one or more parts of the data packet to the one or more action machines wherein the one or more action machines are identified in an action machine (AM) field in the set of fields encoded in the at least one first rule identifying the characteristics of the at least one first rule.

14. The computer program product of claim 12, wherein the at least one first rule comprises an equality compare mask (ECM) field and an equality compare value (ECV) field in the set of fields encoded in the at least one first rule identifying the characteristics of the at least one first rule, wherein the equality compare value (ECV) field comprises first bits of data to be compared with second bits of data read from a particular position of the data packet, wherein the first bits of data contained in the equality compare value (ECV) field are excluded from comparison with the second bits of data from the particular position of the data packet if third bits at corresponding positions in the equality compare mask (ECM) field prescribe a masking of the first bits of data contained in the equality compare value (ECV) field, and wherein the a particular position of the data packet are identified by a packet pointer field and one or more offset fields in the set of fields encoded in the at least one first rule identifying the characteristics of the at least one first rule.

15. The computer program product of claim 12, wherein, during execution of the instruction in the repeat operation mode, the parser is operable to read and use packet pointers which are dynamically updated during the execution of the instruction and wherein each packet pointer points to a begin of a section of data of the data packet to be processed in one repeat by the instruction in the repeat operation mode.

16. The computer program product of claim 12, wherein the instruction in the repeat operation mode is implemented as part of the loaded at least one first rule or as an extension to the loaded at least one first rule.

17. The computer program product of claim 16, wherein the loaded at least one first rule comprises a rule type identifier in a rule type (RT) field in the set of fields encoded in the at least one first rule identifying the characteristics of the at least one first rule.

18. The computer program product of claim 12, wherein determining the number of one or more repeats to be executed by the parser is executed before or at the moment when the parser starts executing the instruction in repeat operation mode.

19. The computer program product of claim 14, wherein at least one protocol to be used to forward or process the data packet is identified by comparing data contained in a header field of the data packet with data contained in the equality compare value (ECV) field in the set of fields encoded in the loaded at least one first rule identifying the characteristics of the at least one first rule.

20. The computer program product of claim 12, wherein the data packet comprises two or more nested data layers, each data layer consisting of an envelope and a payload section, wherein the payload section of a first data layer comprises the envelope and payload section of a second data layer, and wherein at least one second rule to be loaded and being operable to process the data contained in the second data layer is determined by the parser by executing the at least one first rule on data values being contained in the envelope of the first data layer.

21. The computer program product of claim 15, wherein each packet pointer points to a first bit of a set of adjacent bits in the data packet, and wherein, for each repeat executed by the parser, one of the set of adjacent bits is transferred to one or more action machines.

* * * * *